United States Patent
Ogami

(10) Patent No.: US 8,855,824 B2
(45) Date of Patent: Oct. 7, 2014

(54) DUAL ARM ROBOT

(75) Inventor: Kazunori Ogami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 13/500,961

(22) PCT Filed: Nov. 29, 2010

(86) PCT No.: PCT/JP2010/071756
§ 371 (c)(1),
(2), (4) Date: Apr. 9, 2012

(87) PCT Pub. No.: WO2011/068227
PCT Pub. Date: Jun. 9, 2011

(65) Prior Publication Data
US 2012/0197438 A1 Aug. 2, 2012

(30) Foreign Application Priority Data

Dec. 2, 2009 (JP) ................................. 2009-274307

(51) Int. Cl.
| | | |
|---|---|---|
| G06F 19/00 | (2011.01) | |
| G05B 19/00 | (2006.01) | |
| G05B 19/04 | (2006.01) | |
| G05B 15/00 | (2006.01) | |
| B25J 9/16 | (2006.01) | |

(52) U.S. Cl.
CPC .............. *B25J 9/1682* (2013.01); *B25J 9/1697* (2013.01); *G05B 2219/45064* (2013.01); *G05B 2219/40307* (2013.01); *G05B 2219/39123* (2013.01); *G05B 2219/39529* (2013.01)
USPC ........... 700/259; 700/245; 700/247; 700/248; 700/250; 700/251; 700/258

(58) Field of Classification Search
CPC .................... B25J 9/1682; G05B 2219/39109; G05B 2219/39129; G05B 2219/40307
USPC ......... 700/245, 247, 248, 250, 251, 258, 259; 901/46, 47
See application file for complete search history.

(56) References Cited

U.S. PATENT DOCUMENTS

| | | | |
|---|---|---|---|
| 6,141,863 A | | 11/2000 | Hara et al. |
| 2005/0273199 A1 * | | 12/2005 | Ban et al. ...................... 700/248 |

(Continued)

FOREIGN PATENT DOCUMENTS

| | | |
|---|---|---|
| EP | 2 018 940 A2 | 1/2009 |
| JP | 63-225796 A | 9/1988 |

(Continued)

OTHER PUBLICATIONS

Notification of Transmittal of the International Search Report and the Written Opinion of the International Searching Authority, the International Search Report, and the Written Opinion of the International Searching Authority dated Mar. 14, 2011.

(Continued)

*Primary Examiner* — Khoi Tran
*Assistant Examiner* — Robert Nguyen
(74) *Attorney, Agent, or Firm* — Fitzpatrick, Cella, Harper & Scinto

(57) ABSTRACT

The dual arm robot includes a first arm including a first hand, a first visual sensor and a first force sensor, and a second arm including a second hand, a second visual sensor and a second force sensor, uses each visual sensor to detect positions of a lens barrel and a fixed barrel to hold and convey them to a central assembling area, uses the first visual sensor to measure a position of a flexible printed circuits to insert the flexible printed circuits into the fixed barrel, and uses outputs of the force sensors to fit and assemble the fixed barrel onto the lens barrel under force control. The dual arm robot converts a position coordinate of a workpiece detected by each visual sensor to a robot coordinate to calculate a trajectory of each hand and drive each arm, to thereby realize cooperative operation of the two arms.

2 Claims, 7 Drawing Sheets

(56) References Cited

U.S. PATENT DOCUMENTS

2009/0025199 A1* 1/2009 Hariki et al. .................. 29/430
2010/0332032 A1* 12/2010 Moriyama et al. ............ 700/258

FOREIGN PATENT DOCUMENTS

| JP | 09-146624 A | 6/1997 |
| JP | 10-124121 A | 5/1998 |
| JP | 11-157497 A | 6/1999 |
| JP | 2008-168406 A | 7/2008 |
| JP | 2009-148845 A | 7/2009 |
| JP | 2009-214265 A | 9/2009 |
| JP | 2009-269110 A | 11/2009 |
| WO | 98/17444 A1 | 4/1998 |

OTHER PUBLICATIONS

K. Nakazawa, "Compensation of Robot Hand Position Using Vision Sensor", Dept. of Mechanical Engineering, Faculty of Science and Technology, Keio University, IEEE, 1994, pp. 847-851.

* cited by examiner

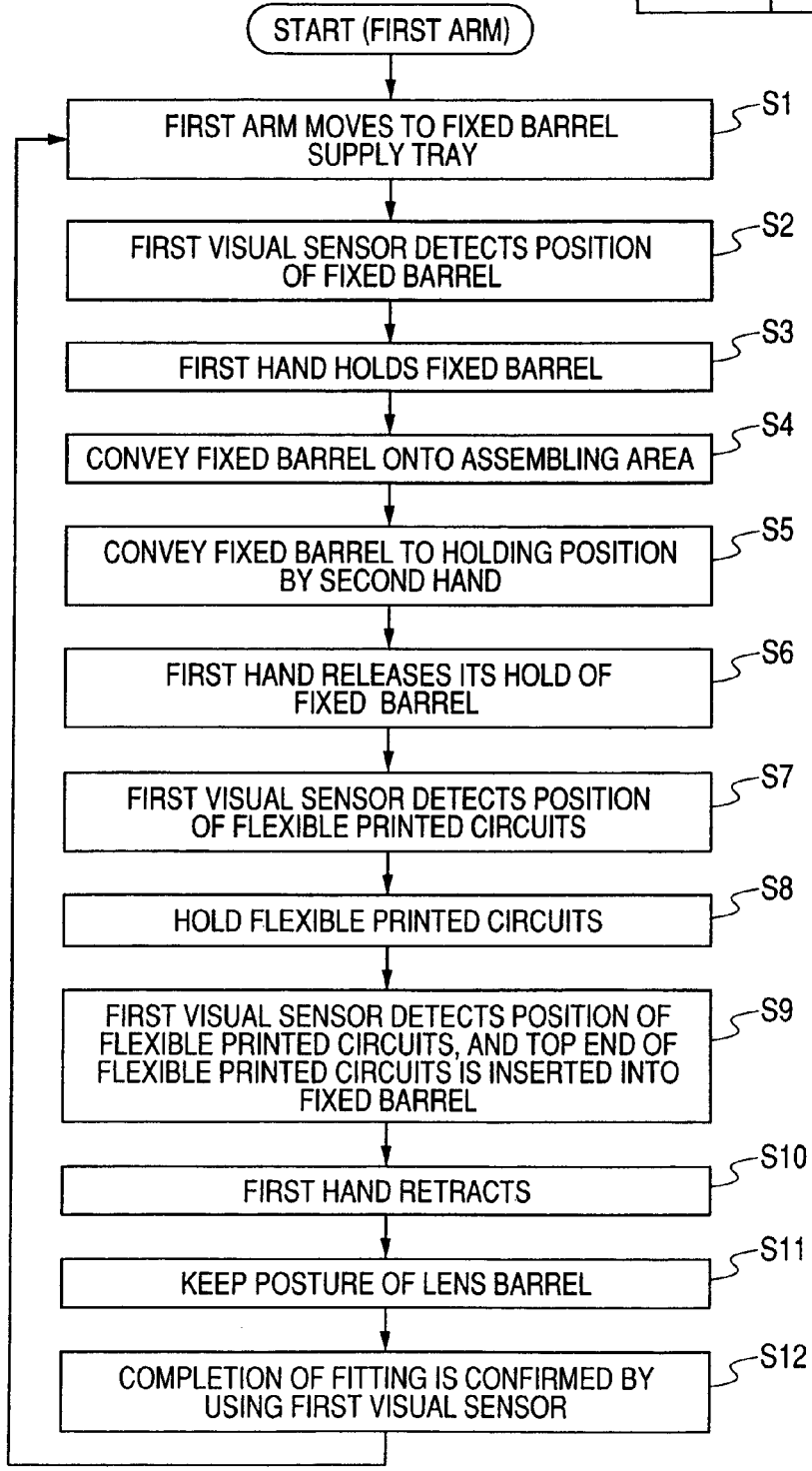

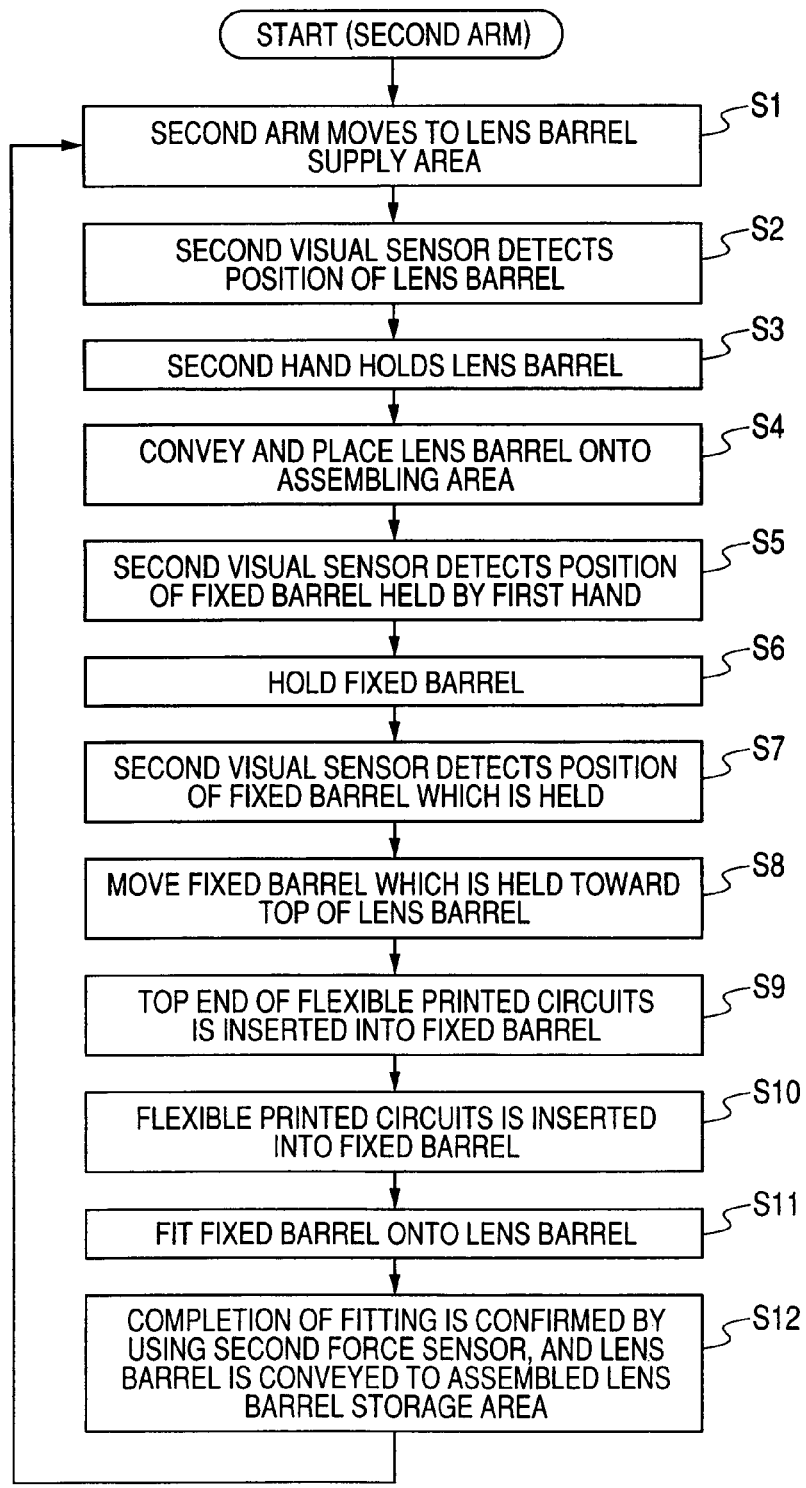

DUAL ARM ROBOT

TECHNICAL FIELD

The present invention relates to a dual arm robot having a structure, in which two arms, each being provided with a visual sensor, are cooperatively operated with each other to assemble workpieces.

BACKGROUND ART

Assembling work by a robot has been widely adopted, and most robots have a position and posture instructed in advance and perform repetitive work according to the instruction. In recent years, there has been a demand for more advanced work such as fitting one part to another. As disclosed in International Publication NO. WO98/017444, there is known a force control robot system which uses workpiece position detection by a visual sensor and force control by a force sensor. This system includes, as illustrated in FIG. 4, a force sensor 103 and a hand 104 mounted on a finger section 102 of a robot 101, a controller 105 for controlling the robot 101, etc., and fits a first part 107 held by a holding claw of a hand 104 into a second part 108. The second part 108 is positioned by a positioning device 109, and a visual sensor 110 for detecting the positions and postures of the first part 107 and the second part 108 is fixed to a surface plate 111.

The force control robot system includes a hand for holding a first part, a robot including a force sensor for detecting force applied to the first part, a visual sensor for obtaining image data to obtain a positional relationship between the first part and a second part, and a control unit for controlling the robot and the visual sensor. The control unit includes a fitting operation performing unit for moving the first part held by the hand of the robot close to the second part and performing fitting operation under force control based on an output of the force sensor. The control unit also includes a correcting unit for obtaining workpiece position data representing a positional relationship between the first part and the second part based on image data obtained by the visual sensor, and for correcting the position and posture of the robot based on the obtained workpiece position data, in advance of the fitting operation. Further, the control unit includes a discriminating unit for obtaining data representing a fitting state of the first part in the second part based on image data of the first part and the second part obtained by the visual sensor, and for discriminating whether or not the parts are in a properly fitted state based on the obtained fitting state data, after completing the fitting operation.

Dual arm robots with two arms are also beginning to be introduced to production sites. As disclosed in Japanese Patent Application Laid-Open No. 2008-168406, a workpiece mounting system is known in which a dual arm robot can hold two workpieces and mount one workpiece on another with high precision.

SUMMARY OF INVENTION

In the conventional examples described above, there are the following problems due to the visual sensor being fixed at one place and always in the same position.

If one workpiece has a moving portion like a hinged fold-open/close portion or a cable, it is difficult to perform complicated work as assembling one workpiece to the other workpiece while lifting and deflecting the moving portion. In other words, it is difficult to cooperatively operate two arms in such a manner that the two arms each recognize the position of the workpiece held by the other and simultaneously operate to assemble the workpieces, including the operation of assembling one workpiece to the other workpiece while manipulating the posture of the moving portion.

In assembling a flexible object including flexible printed circuits (flexible printed board) and a cable, even after the flexible object is held by the hand, the flexible object is bent under the influence of gravity and inertia force during conveyance, and therefore the shape of the flexible object is changed over time. In order to achieve high assembling precision, posture change of the flexible object is required to be monitored by a visual sensor. However, it is difficult for a stationary visual sensor to track posture change of a flexible object.

In order to detect a predetermined portion of a workpiece by a visual sensor, a jig for clamping a workpiece in place is required. As a result, when a type of workpiece is changed, it is necessary to make a setup change to modify the jig, which leads to a time consuming and costly process.

The present invention provides a dual arm robot, which has broad utility, and is able to perform complicated work efficiently and cooperatively.

In order to achieve the above-mentioned objects, according to the present invention, a dual arm robot causing a first arm and a second arm to cooperatively operate, includes: the first arm including a first hand and a first visual sensor; the second arm including a second hand and a second visual sensor; and a controller which uses an output of one of the first visual sensor and the second visual sensor, to thereby control one of the first arm and the second arm including another of the first visual sensor and the second visual sensor.

In the configuration described above, the two arms each can move their visual sensors close to each workpiece to detect a position coordinate of the workpiece. The detected position coordinate of the workpiece is converted from a visual sensor coordinate system to a robot coordinate system, a trajectory required to hold the workpiece is calculated with reference to the robot coordinate system, and the workpiece is held by each hand. The position coordinate of the workpiece held by each hand is detected again by the visual sensors, to thereby confirm a relative position between the first arm and the second arm. Next, a trajectory of each hand required for assembly work is calculated to control a movement of each arm. Each arm is provided with a visual sensor, and an output of one visual sensor is used to control the arm equipped with the other visual sensor. Therefore, two arms share and recognize the position coordinate of the workpiece to perform assembly work.

In assembling workpieces including a flexible object such as flexible printed circuits and a cable, it is possible to achieve high assembling precision by using the visual sensor to track the flexible object which changes its shape over time.

It is possible to keep the posture of a workpiece by the hand of one arm while detecting the position coordinate of the workpiece by the visual sensor of the other arm, to thereby perform assembly work. Therefore, it is not necessary to change the jig for fixing the workpiece every time a type of workpiece is changed, and it is also not necessary to make a setup change to modify the jig, as a result of which the time and cost are reduced.

Further features of the present invention will become apparent from the following description of exemplary embodiments with reference to the attached drawings.

BRIEF DESCRIPTION OF DRAWINGS

FIG. 2A is a flowchart illustrating a work sequence according to the embodiment. FIG. 2 is comprised of FIGS. 2A and 2B.

FIG. 2B is a flowchart illustrating a work sequence according to the embodiment. FIG. 2 is comprised of FIGS. 2A and 2B.

DESCRIPTION OF EMBODIMENT

Figure 1A:
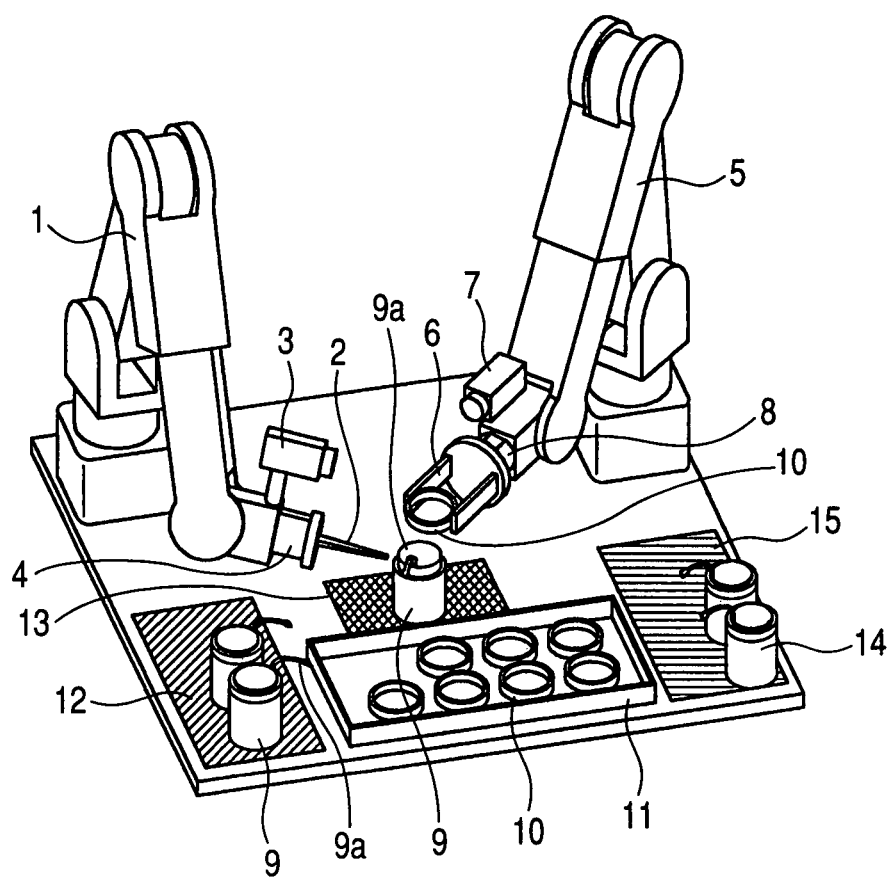
FIG. 1A is a perspective view generally illustrating a dual arm robot according to an embodiment.

As illustrated in FIG. 1A, this embodiment is a dual arm robot which performs assembly work of a lens barrel of a camera. A first arm 1 includes a first hand 2 and a first visual sensor 3 fixed to a wrist section of the first arm 1, the wrist section having a first force sensor 4 mounted thereon (incorporated therein). A second arm 5 includes a second hand 6 and a second visual sensor 7, and a wrist section of the second arm 5 has a second force sensor 8 mounted thereon (incorporated therein). The two arms 1 and 5 each include a control unit for controlling a movement of the arm, and are mutually in communication with a controller (now shown).

Output value data (output) of each visual sensor for detecting a position (position coordinate) of each hand and each force sensor are all commonly used by the controller (control unit). By performing coordinate conversion and calculation of a trajectory for assembly work based on the data, cooperative control required for assembly work of a lens barrel 9 and a fixed barrel 10 as workpieces is performed. The fixed barrels 10 are placed on a fixed barrel supply tray 11. The lens barrels 9 are placed on a lens barrel supply area 12, the lens barrels 9 each including flexible and thin flexible printed circuits 9a which extend from a top end of the lens barrel 9. In an assembling area 13, the lens barrel 9 and the fixed barrel 10 are assembled together. An assembled lens barrel 14 is placed in an assembled lens barrel storage area 15.

Figure 1B:
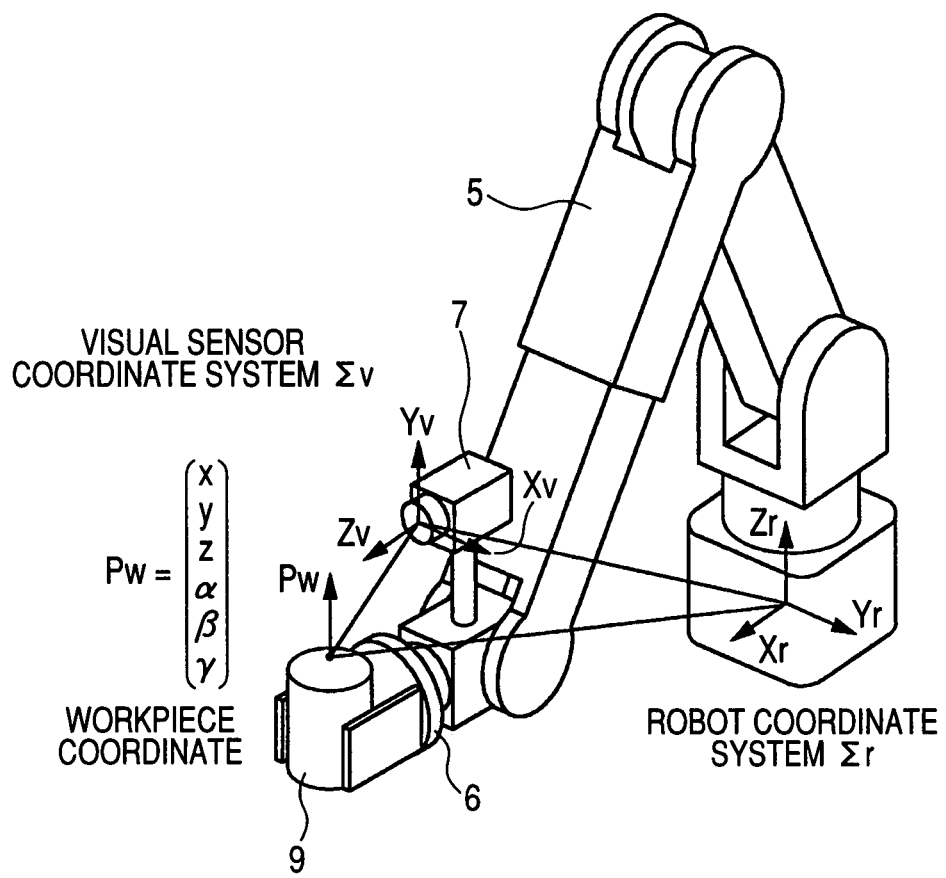
FIG. 1B is a view illustrating a coordinate conversion of the dual arm robot according to the embodiment.

FIG. 1B illustrates a relationship among a workpiece coordinate Pw which is a position coordinate of a workpiece in a process of holding the lens barrel 9 using the second arm 5, the second hand 6, and the second visual sensor 7, a visual sensor coordinate system $\Sigma v$, and a robot coordinate system $\Sigma r$ which represents the position coordinate of the second hand 6. This also applies to the first arm 1, the first hand 2, and the first visual sensor 3. The visual sensor coordinate system $\Sigma v$ is a coordinate system with the origin at the position of the provided visual sensor. The robot coordinate system $\Sigma r$ is a coordinate system with the origin at the base of the arm.

Those coordinate systems are each set in the controller (control unit).

Figure 1C:
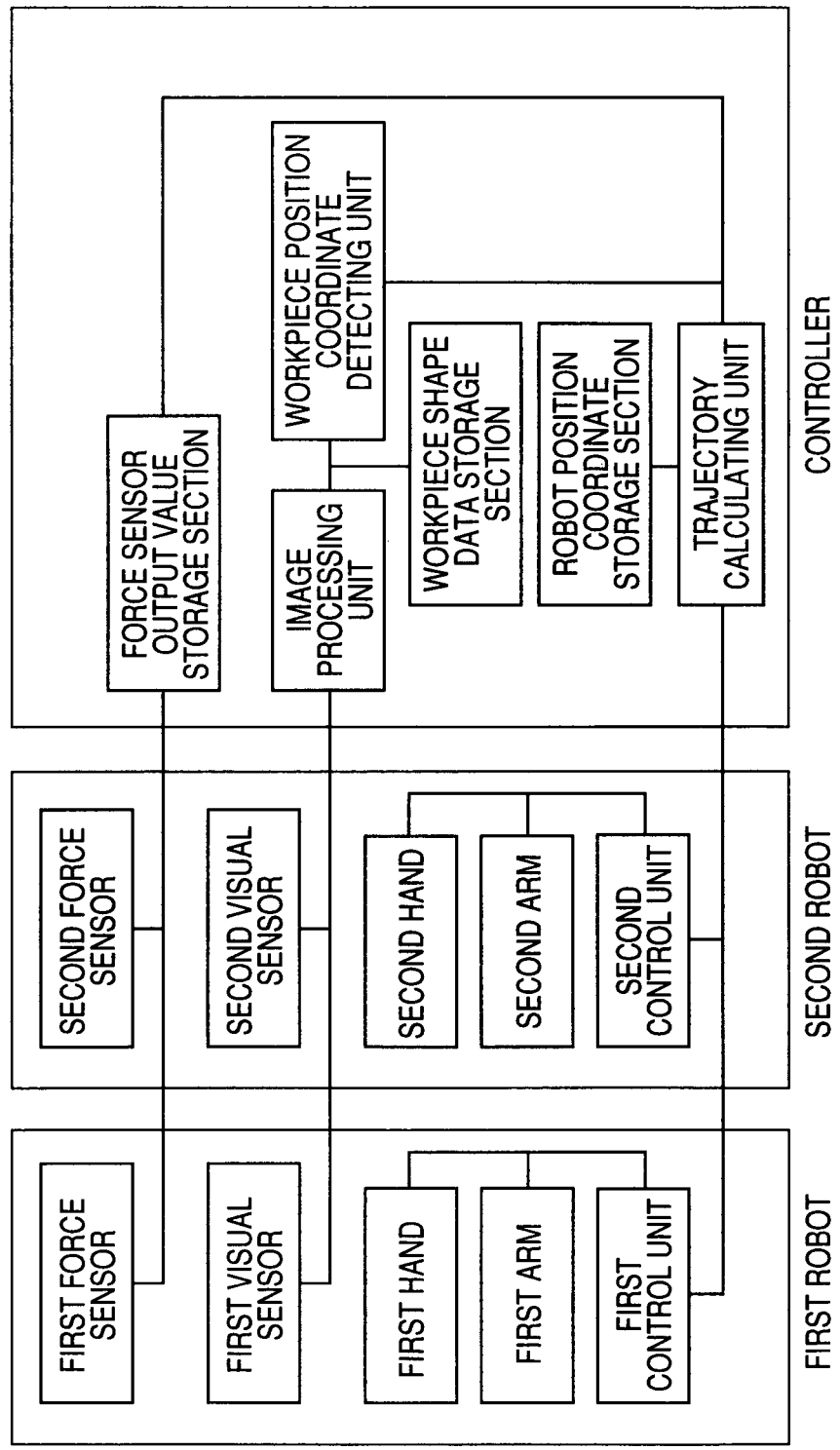
FIG. 1C is a block diagram illustrating a configuration of the dual arm robot according to the embodiment.

FIG. 1C is a block diagram illustrating a configuration of the dual arm robot according to this embodiment. A first robot and a second robot are each mutually in communication with the controller.

The output values of the force sensors are stored in a force sensor output value storage section, and based on the obtained results, a trajectory calculating unit corrects the movements of the arms and the hands.

The output of the visual sensor mounted on the first robot and the output of the visual sensor mounted on the second robot both are processed by an image processing unit, and the shape, position or posture of a workpiece is extracted. A workpiece position coordinate detecting unit calculates the position of the workpiece using the processed data.

Here, by using the data of workpiece shapes stored in a workpiece shape data storage section in advance, the workpiece position coordinate detecting unit can detect the position and posture of a workpiece with higher precision.

A robot position coordinate storage section stores a work sequence taught in advance and the position coordinates for the movements of the arms and the hands. The trajectory calculating unit performs correction from the outputs of the force sensors and the visual sensors, to thereby correct the movements of the arms and the hands. The dual arm robot includes a control unit to operate each of the arms and the hands based on the results of trajectory calculation.

In the workpiece position coordinate detecting unit, it is determined whether or not the arm equipped with one visual sensor is controlled by using an output of the other visual sensor.

From an operational flowchart set for the dual arm robot, it may be known in advance that a workpiece is visible from one visual sensor but not from the other visual sensor in a particular operational step. In that case, for the particular operational step, the workpiece position coordinate detecting unit may detect the position/posture of the workpiece based on an output of one visual sensor, and the trajectory calculating unit may calculate the trajectory of the arm equipped with the other visual sensor.

In detecting the position/posture of a workpiece by means of, for example, template matching with respect to the data of the workpiece shapes described above, image information from one visual sensor alone may not be sufficient to recognize the workpiece. The workpiece position coordinate detecting unit may be configured to use an output of the other visual sensor to deal with this situation. In this case, the trajectory calculating unit may be configured to perform a trajectory calculation according to the output of the other visual sensor if the output of the other visual sensor is used.

The arms are each provided with a visual sensor, and the outputs of both visual sensors are processed by the image processing unit. Therefore, two arms are capable of sharing and recognizing the position coordinate of the workpiece to perform assembly work.

In the following description, the assembly work of the lens barrel is described by way of example and with reference to FIGS. 1A to 1C, 2A, 2B, 3A, and 3B.

Figure 3A:
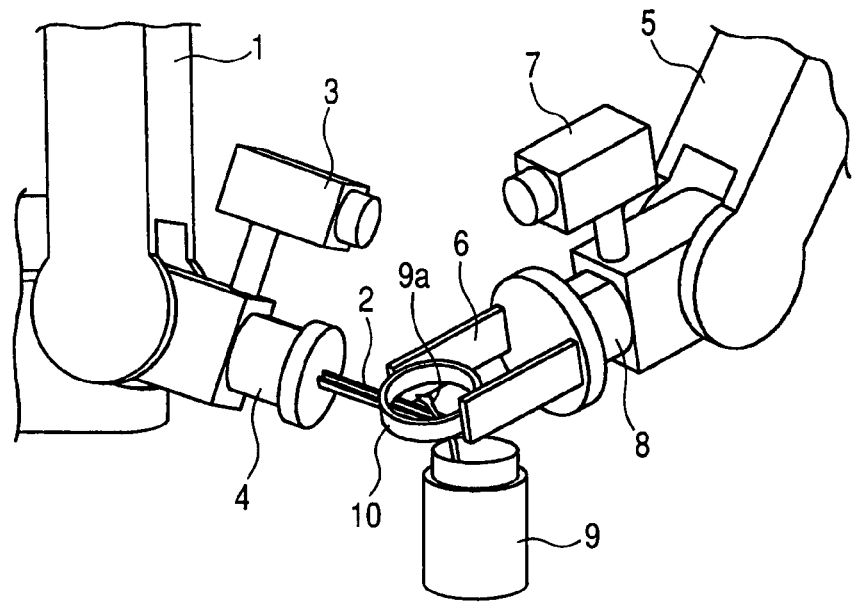
FIG. 3A illustrates an operation of the apparatus illustrated in FIGS. 1A, 1B and 1C, in a situation in which flexible printed circuits are being aligned with a fixed barrel by cooperative operation.
Figure 3B:
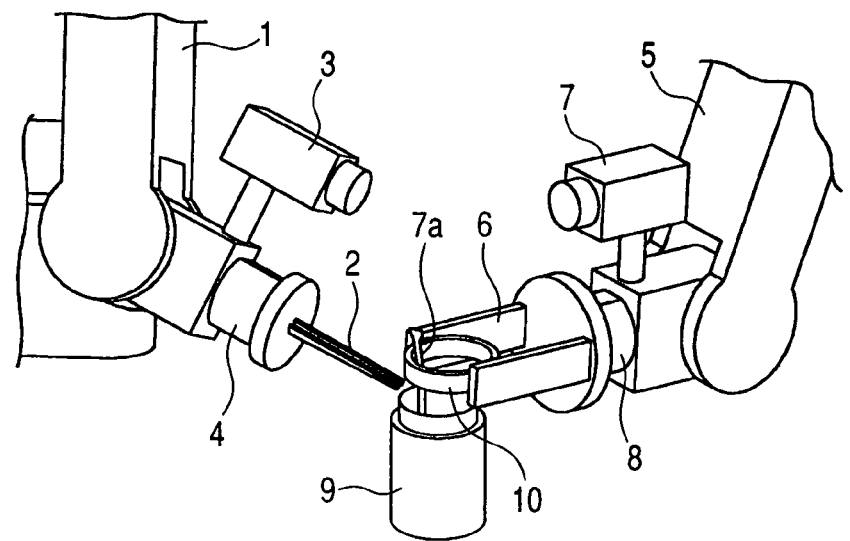
FIG. 3B illustrates an operation of the apparatus illustrated in FIGS. 1A, 1B and 1C, in a situation in which a hand is being retracted while the flexible printed circuits is inserted into the fixed barrel.
Figure 4:
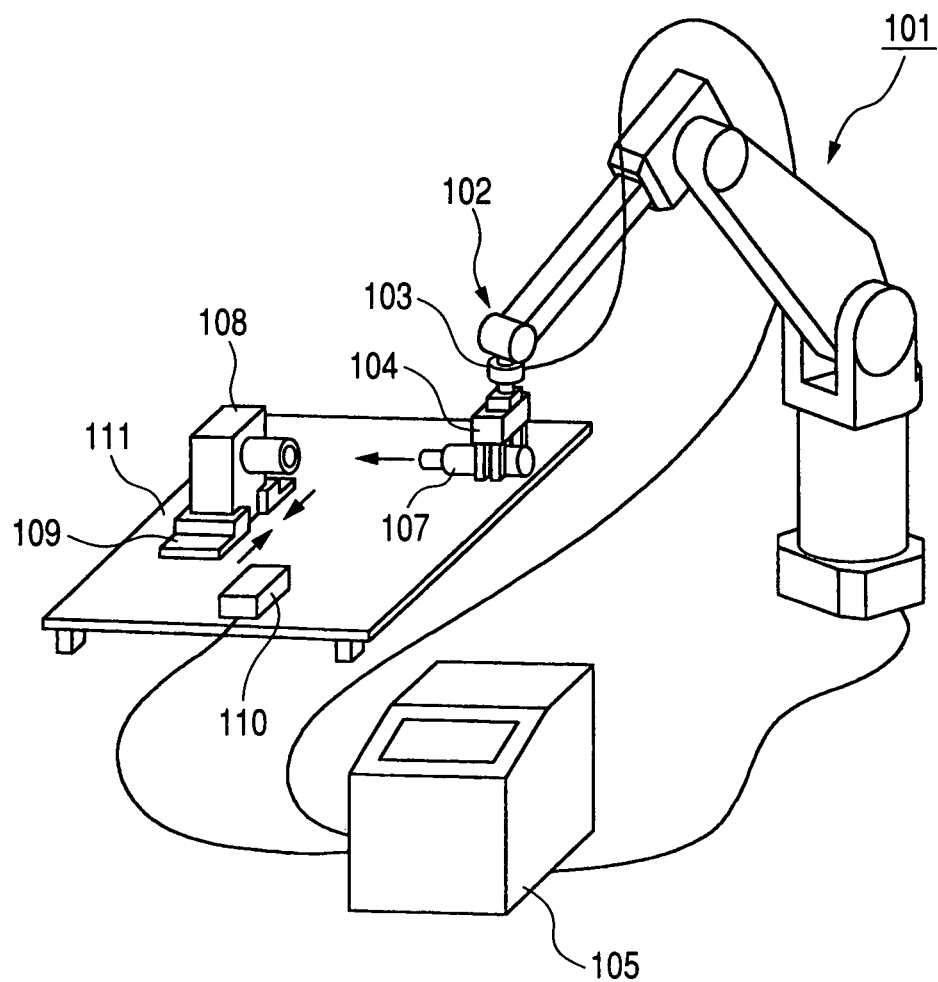
FIG. 4 is a view illustrating a related example.

In the cooperative operation illustrated in the flowchart in FIGS. 2A and 2B, as illustrated in FIG. 3A, the first arm 1 and the second arm 5 move the flexible printed circuits 9a of the lens barrel 9 and the fixed barrel 10 close to each other while aligning the direction of the top end of the flexible printed circuits 9a with the direction of the central axis of the fixed barrel 10. Then, as illustrated in FIG. 3B, after inserting the flexible printed circuits 9a into the fixed barrel 10, the first hand 2 is retracted while the second hand 6 is lowered, and the flexible printed circuits 9a are inserted into the fixed barrel 10.

The work sequence of this embodiment is described according to the flowchart in FIGS. 2A and 2B. First, the first arm 1 moves near the fixed barrel supply tray 11 and is oriented to detect the position of the fixed barrel 10 arranged on the fixed barrel supply tray 11 by the first visual sensor 3. The second arm 5 moves near the lens barrel supply area 12 and is oriented to detect the position of the lens barrel 9 by the second visual sensor 7 (S1).

The first arm 1 uses the first visual sensor 3 to detect a holding position of the fixed barrel 10. Shape data of the workpiece created by a system such as computer aided design (CAD) is stored in the controller in advance. In detecting an edge of the fixed barrel 10 using the first visual sensor 3, the workpiece position coordinate detecting unit refers to the shape data to calculate a position of a center point of a circle representing the edge as the workpiece coordinate. From the relative distance between the workpiece coordinate and the hands, the trajectory calculating unit calculates distances the arms are to move, and each arm moves to its holding position.

To control the movement of each arm, a conversion unit included in the controller performs coordinate conversion of the workpiece coordinate, and converts the visual sensor coordinate system to the robot coordinate system. The conversion unit performs coordinate conversion with respect to a fixed barrel coordinate which is the workpiece coordinate of the fixed barrel 10 and a lens barrel coordinate which is the workpiece coordinate of the lens barrel 9, respectively. Similarly, the second arm 5 uses the second visual sensor 7 to detect the position of the lens barrel 9, and the second arm 5 moves to its holding position (S2).

The holding positions of the workpieces are stored in the controller in advance, and the controller calculates the holding positions based on the workpiece coordinates detected in Step S2. The first hand 2 holds the fixed barrel 10 and the second hand 6 holds the lens barrel 9 (S3).

The first arm 1 waits, while holding the fixed barrel 10 above the assembling area 13. The second arm 5 places the lens barrel 9 on the assembling area surface. The second arm 5 lowers the lens barrel 9, while keeping the posture of the lens barrel 9 held by the second arm 5 perpendicular to the assembling area surface. The second arm 5 reduces the lowering speed as a bottom surface of the lens barrel 9 and the assembling area surface get closer, and contacts the bottom surface of the lens barrel 9 with the assembling area surface. The distance between the bottom surface of the lens barrel 9 and the assembling area surface is calculated from the moving distance of the second arm 5. When the bottom surface of the lens barrel 9 contacts with the assembling area surface, the output value of the second force sensor 8 increases. The controller detects that the lens barrel 9 is placed on the assembling area surface when the output value exceeds a threshold value and causes the second hand 6 to release its hold of the lens barrel 9 (S4).

The first arm 1 keeps the posture of the fixed barrel 10 in a position where the fixed barrel 10 is easily held by the second arm 5. The second arm 5 uses the second visual sensor 7 to detect the position of the fixed barrel 10 held by the first hand 2 (S5).

The second hand 6 holds the fixed barrel 10 held by the first hand 1, which is detected in Step S5. After the fixed barrel 10 is held by the second hand 6, the first hand 2 releases its hold of the fixed barrel 10. The controller monitors output values of the first force sensor 4 and the second force sensor 8 during the handover of the fixed barrel 10, to thereby perform force control so as to prevent the fixed barrel 10 from being broken due to the application of excessive force (S6).

The placement position of the lens barrel 9 is already known as the position of the lens barrel 9 placed by the second arm 5 in Step S4. The controller estimates the posture of the lens barrel 9 and the position of the flexible printed circuits 9a based on the placement position, and picks up an image of the lens barrel 9 using the first visual sensor 3. The flexible printed circuits 9a tend to change their posture because the flexible printed circuits 9a are thin and flexible. Therefore, if the first visual sensor 3 does not succeed to pick up an image which is sufficient to detect the position of the flexible printed circuits 9a with high precision in the first attempt, the controller estimates the front position of the flexible printed circuits 9a based on the detected edge. The controller changes the image pick-up angle so that the flexible printed circuits 9a face the front, and picks up an image again to detect the top end of the flexible printed circuits 9a with high precision. At the same time, the position of the fixed barrel 10 held by the second hand 6 is detected by the second visual sensor 7 (S7).

Next, the first hand 2 holds the flexible printed circuits 9a. The second arm 5 moves the fixed barrel 10 held by the second arm 5 toward the top of the lens barrel 9 (S8).

The flexible printed circuits 9a held by the first hand 2 are deformed due to the holding action, and hence the first visual sensor 3 cannot pick up a front image of the flexible printed circuits 9a. Therefore, the second visual sensor 7 picks up the front image of the flexible printed circuits 9a to detect the position of the flexible printed circuits 9a. From the position of the fixed barrel 10 and the position of the flexible printed circuits 9a detected in Step S7, the trajectory calculating unit of the controller calculates a trajectory in which the direction of the central axis of the fixed barrel 10 is aligned with the direction of the top end of the flexible printed circuits 9a and the flexible printed circuits 9a extend through the fixed barrel 10. The controller operates the first arm 1 and the second arm 5 simultaneously according to the calculated trajectory. As illustrated in FIG. 3A, the first arm 1 and the second arm 5 move the flexible printed circuits 9a and the fixed barrel 10 close to each other, while aligning the direction of the top end of the flexible printed circuits 9a with the direction of the central axis of the fixed barrel 10, to thereby insert the top end of the flexible printed circuits 9a into the center of the fixed barrel 10 (S9).

Next, the first hand 2 releases its hold of the flexible printed circuits 9a, and the first hand 2 retracts from between the fixed barrel 10 and the lens barrel 9. At the same time of the retraction, the flexible printed circuits 9a tend to return to their original shape by their resiliency and gravity and get out of the fixed barrel 10. In order to prevent the flexible printed circuits 9a from getting out of the fixed barrel 10 concurrently with the retraction of the first hand 2, the second hand 6 keeps the top end of the flexible printed circuits 9a and the central axis of the fixed barrel 10 in alignment as the second hand 6 moves downward, and inserts the flexible printed circuits 9a into the fixed barrel 10 as illustrated in FIG. 3B (S10).

The retracted first hand 2 holds the lens barrel 9 and keeps its posture. Next, the first visual sensor 3 detects the position of the central axis of the lens barrel 9, and the second visual sensor 7 detects the central axis of the fixed barrel 10. The first arm 1 and the second arm 5 assemble the fixed barrel 10 and the lens barrel 9 in such a manner that their central axes align with each other. Here, the first arm 1 measures force applied to the lens barrel 9 from the output value of the first force sensor 4, and the second arm 5 measures force applied to the fixed barrel 10 from the output value of the second force sensor 8. The output value of each force sensor can be used for correcting the assembly trajectory, to thereby fit the fixed barrel 10 onto the lens barrel 9 under force control (S11).

When the output value from the second force sensor 8 exceeds the threshold value, the fitting and assembling is completed. The first visual sensor 3 is used to pick up a side image of the lens barrel 9 to confirm the completion of the fitting and assembling. The assembled lens barrel 14 is conveyed to the assembled lens barrel storage area 15 by the second arm 5 (S12). After the assembled lens barrel 14 is conveyed, the process returns to Step S1 and each arm moves to the workpiece supply position to start the next assembly work. The first arm 1 and the second arm 5 are cooperatively operated with each other from Step S7 to Step S11.

The first arm 1 and the second arm 5 move the flexible printed circuits 9*a* and the fixed barrel 10 close to each other, while aligning the direction of the top end of the flexible printed circuits 9*a* with the direction of the central axis of the fixed barrel 10, and insert the flexible printed circuits 9*a* into the fixed barrel 10. Subsequently, the second hand 6 moves downward concurrently with the retraction of the first hand 2, to thereby insert flexible printed circuits 9*a* into the fixed barrel 10. The flexible printed circuits 9*a*, which are thin and flexible, are easy to deform. Therefore, although it has been difficult to perform assembly work by a robot, the assembly work can be realized by the cooperative operation of the dual arm robot according to this embodiment.

After the flexible printed circuits 9*a* are held by the first hand 2, even if its posture is changed due to the holding action and the first visual sensor 3 cannot pick up the front image of the flexible printed circuits 9*a*, it is possible to use the second visual sensor 7 to pick up the front image of the flexible printed circuits 9*a* to detect its position with high precision.

Even if a workpiece is in a position or posture which is difficult to be detected by one visual sensor, it is possible to operate the other visual sensor to pick up the image of the workpiece to detect its position with high precision. As a result, highly precise assembly is possible.

The first visual sensor 3 detects the position of the central axis of the lens barrel 9, and the second visual sensor 7 detects the central axis of the fixed barrel 10. The first arm 1 and the second arm 5 assemble the fixed barrel 10 and lens barrel 9 in such a manner that their central axes align with each other. Here, the first arm 1 measures force applied to the lens barrel 9 from the output value of the first force sensor 4, and the second arm 5 measures force applied to the fixed barrel 10 from the output value of the second force sensor 8. The output value of each force sensor can be used to correct the assembly trajectory of each arm, to thereby fit the fixed barrel 10 onto the lens barrel 9 under force control. As a result, it is possible to realize highly precise fitting of workpieces without a jig for clamping a workpiece.

Note that, although the visual sensor is configured to be provided in the wrist section of the arm in this embodiment, it can be mounted on the hand section with the same effect. Further, although the output of the second visual sensor is used to perform the trajectory calculation of the first arm by way of example in this embodiment, the first visual sensor may be used for the second arm in the same manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-274307, filed Dec. 2, 2009, which is hereby incorporated by reference herein in its entirety.

The invention claimed is:

1. A dual arm robot causing a first arm and a second arm to cooperatively operate, comprising:
    the first arm including a first hand and a first visual sensor;
    the second arm including a second hand and a second visual sensor; and
    a controller,
    wherein, in an operation for assembling a first workpiece and a second workpiece by using the first arm and the second arm, when the first visual sensor is able to detect the first workpiece and the second visual sensor is able to detect the second workpiece, the first visual sensor detects the first workpiece held by the first arm and the second visual sensor detects the second workpiece held by the second arm,
    wherein, in the operation, when the first visual sensor is unable to detect the first workpiece, the second visual sensor detects a position coordinate of the first workpiece, or when the second visual sensor is unable to detect the second workpiece, the first visual sensor detects a position coordinate of the second workpiece, and
    wherein the controller uses a robot coordinate system containing position coordinates of the first and second hands, a first visual sensor coordinate system containing the position coordinate of a workpiece detected by the first visual sensor, and a second visual sensor coordinate system containing the position coordinate of a workpiece detected by the second visual sensor, so that the controller converts the position coordinate of the workpiece from the first and second visual sensor coordinate systems to the robot coordinate system and controls movements of the first and second arms in the operation for assembling the first workpiece and the second workpiece.

2. A dual arm robot according to claim 1, further comprising:
    a first force sensor mounted on the first arm; and
    a second force sensor mounted on the second arm,
    wherein the controller corrects the movements of the first and second arms based on output of the first and second visual sensors.

* * * * *